United States Patent [19]

Wilkinson

[11] Patent Number: 5,172,218
[45] Date of Patent: Dec. 15, 1992

[54] METHODS OF AND APPARATUS FOR DIGITAL VIDEO SIGNAL PROCESSING

[75] Inventor: James H. Wilkinson, Basingstoke, England

[73] Assignee: Sony Corporation, Tokyo, Japan

[21] Appl. No.: 606,098

[22] Filed: Oct. 31, 1990

[30] Foreign Application Priority Data

Nov. 27, 1989 [GB] United Kingdom ............... 8926772

[51] Int. Cl.$^5$ ............................................ H04N 9/75
[52] U.S. Cl. ...................................... 358/13; 358/22
[58] Field of Search .................. 358/13, 22 CR, 22; 360/32

[56] References Cited

U.S. PATENT DOCUMENTS 4,979,002 12/1990 Snashall et al. .................. 358/13

FOREIGN PATENT DOCUMENTS 2051517 1/1981 United Kingdom ............... 358/13

*Primary Examiner*—James J. Groody
*Assistant Examiner*—Kim Yen Vu
*Attorney, Agent, or Firm*—Alvin Sinderbrand; William S. Frommer

[57] ABSTRACT

Apparatus for demultiplexing an input 4:4:4:4-standard digital video signal into first and second output 4:2:2-standard digital video signals comprises a demultiplexer for separating the input video signal into a luminance input signal, two chrominance input signals, and a key input signal; for each said chrominance input signal, a first low-pass filter for low-pass filtering said chrominance input signal with a cut-off frequency preferably equal to 7/16 the Nyquist frequency of the input chrominance signal, a sub-sampler for sub-sampling the signal from the first filter at a ratio of 2:1 to provide a first chrominance output signal, a subtracter for subtracting the signal from the first filter from the input chrominance signal, a demodulator for demodulating the signal resulting from the subtraction with a signal preferably of 3/8 the Nyquist frequency, and a second low-pass filter for low-pass filtering the resulting demodulated signal with a cut-off frequency equal to half the Nyquist frequency, the sub-sampler sub-sampling the signal from the second filter at a ratio of 2:1 to provide a second chrominance output signal; and multiplexers for supplying the luminance input signal and two of the chrominance output signals as the first output video signal, and the key input signal and the other two of the chrominance output signals as the second output video signal.

10 Claims, 4 Drawing Sheets

METHODS OF AND APPARATUS FOR DIGITAL VIDEO SIGNAL PROCESSING

BACKGROUND OF THE INVENTION

1. Field of the Invention

This invention relates to methods of and apparatus for digital video signal processing.

2. Description of the Prior Art

Various coding standards have been adopted for digitally encoding the video component of a television signal. One coding standard in common use is the 4:2:2 CCIR 601 standard in which a luminance component is sampled at 13.5 MHz and each of two chrominance components $C_B$ and $C_R$ is sampled at 6.75 MHz. Digital video tape recorders (DVTRs) for recording and reproducing 4:2:2 coded signals with high fidelity are now in common use.

A higher quality standard in the same family, which is beginning to come into use for studio reference signals, is the 4:4:4:4 (or 4×4) system in which a luminance component and each of two chrominance components $C_B$ and $C_R$ are sampled at 13.5 MHz, as is a fourth component, which Is a full bandwidth linear key signal used, for example, in some special effects. There is a requirement to separate or demultiplex a 4:4:4:4 signal into two 4:2:2 signals so that it can be recorded using two 4:2:2 DVTRs, and after subsequent reproduction can be reconstituted. It is very desirable to achieve the demultiplexing in such a way that at least one of the 4:2:2 signals is a true CCIR 601 standard signal suitable for direct use with other CCIR 601 standard equipment.

Problems arise in effecting such separation, particularly with the chrominance components.

Simple demultiplexing of the 4:4:4:4 signal into two 4:2:2 signals is not acceptable, because the chrominance components in each of the resulting 4:2:2 signals will contain large amounts of alias frequencies. Nor is simple frequency separation into low frequency and demodulated high frequency parts acceptable, because there will be filter cross-over regions which will cause significant errors in the region of 3.375 MHz.

SUMMARY OF THE INVENTION

One object of the present invention is to provide an improved method of demultiplexing an input 4:4:4:4-standard digital television signal into first and second output 4:2:2-standard digital video signals.

Another object of the present invention is to provide improved apparatus for demultiplexing an input 4:4:4:4-standard digital television signal into first and second output 4:2:2-standard digital video signals.

Another object of the present invention is to provide an improved method of multiplexing resulting first and second 4:2:2-standard digital video signals into a reconstituted 4:4:4:4-standard digital video signal.

Another object of the present invention is to provide improved apparatus for multiplexing resulting first and second 4:2:2-standard digital video signals into a reconstituted 4:4:4:4-standard digital video signal.

According to the present invention there is provided a method of demultiplexing an input 4:4:4:4-standard digital video signal into first and second output 4:2:2-standard digital video signals, the method comprising the steps of:

separating said input video signal into a luminance input signal, two chrominance input signals, and a fourth component input signal;

in respect of each said chrominance input signal:
- low-pass filtering said chrominance input signal with a first low-pass filter having a cut-off frequency equal to x times the Nyquist frequency of said input chrominance signal, where $0 < x \leq 0.5$;
- sub-sampling the signal from said first filter at a ratio of 2:1 to provide a first chrominance output signal;
- subtracting said signal from said first filter from said input chrominance signal;
- demodulating the signal resulting from said subtraction with a signal of y times said Nyquist frequency, where $y < x$ and $0 < y \leq 0.5$;
- low-pass filtering the resulting demodulated signal with a second low-pass filter having a cut-off frequency equal to half said Nyquist frequency; and
- sub-sampling the signal from said second filter at a ratio of 2:1 to provide a second chrominance output signal; and supplying said luminance input signal and two of said chrominance output signals as said first output video signal, and said fourth component input signal and the other two of said chrominance output signals as said second output video signal.

The present invention also provides a method of reconstituting or multiplexing said input video signal from said first and second output video signals.

According to the present invention there is also provided apparatus for demultiplexing an input 4:4:4:4-standard digital video signal into first and second output 4:2:2-standard digital video signals, the apparatus comprising:

means for separating said input video signal into a luminance input signal, two chrominance input signals, and a fourth component input signal;

for each said chrominance input signal:
- a first low-pass filter for low-pass filtering said chrominance input signal with a cut-off frequency equal to x times the Nyquist frequency of said input chrominance signal, where $0 < x \leq 0.5$;
- means for sub-sampling the signal from said first filter at a ratio of 2:1 to provide a first chrominance output signal;
- a subtracter for subtracting said signal from said first filter from said input chrominance signal;
- a demodulator for demodulating the signal resulting from said subtraction with a signal of y times said Nyquist frequency, where $y < x$ and $0 < y \leq 0.5$;
- a second low-pass filter for low-pass filtering the resulting demodulated signal with a cut-off frequency equal to half said Nyquist frequency; and
- means for sub-sampling the signal from said second filter at a ratio of 2:1 to provide a second chrominance output signal; and means for supplying said luminance input signal and two of said chrominance output signals as said first output video signal, and said fourth component input signal and the other two of said chrominance output signals as said second output video signal.

The present invention also provides apparatus for reconstituting or multiplexing said input video signal from said first and second output video signals.

In a digital system the Nyquist frequency is the highest frequency at which aliasing does not occur; in other words it is half the sampling frequency. For a 4:4:4:4-standard signal with a sampling frequency of 13.5 MHz, and associated sampled data rates of 13.5 MS/s (million samples per second), the Nyquist frequency is 6.75 MHz.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
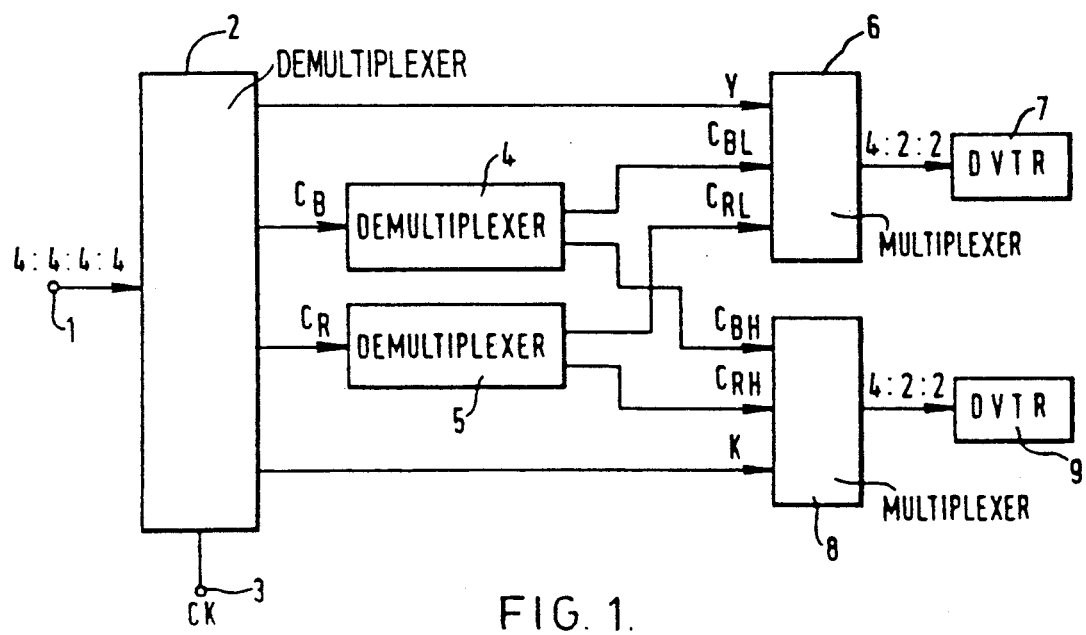
FIG. 1 is a block diagram of an embodiment of demultiplexer apparatus according to the present invention.

Referring first to FIG. 1, a demultiplexer apparatus for demultiplexing an input 4:4:4:4-standard digital video signal comprising a luminance signal Y, two chrominance signals $C_B$ and $C_R$, and a full bandwidth linear key signal K, all sampled at 13.5 MS/s, so that the Nyquist frequency is 6.75 MHz, and forming for example a studio reference signal, will be described. The demultiplexing is into two 4:2:2 signals for recording on respective DVTRs.

The input video signal is supplied by way of an input terminal 1 to a demultiplexer 2 to which a clock signal is supplied by way of a terminal 3. The demultiplexer 2 has four outputs on which appear the luminance signal Y, the two chrominance signals $C_B$ and $C_R$, and the key signal K, respectively, derived from the input video signal. The chrominance signals $C_B$ and $C_R$ are supplied to respective demultiplexers 4 and 5 where they are separated into low frequency and high frequency chrominance component signals $C_{BL}$ and $C_{BH}$, and $C_{RL}$ and $C_{RH}$, respectively. A multiplexer 6 then combines the luminance signal Y and the low frequency chrominance signals $C_{BL}$ and $C_{RL}$ to form a 4:2:2-standard video signal for recording on a 4:2:2-standard DVTR 7. This signal meets the CCIR 601 standard specification, and may be used as such by other CCIR 601 standard equipment. A multiplexer 8 combines the key signal K with the high frequency chrominance signals $C_{BH}$ and $C_{RH}$ to form a 4:2:2 signal for recording on another 4:2:2-standard DVTR 9. This signal meets the CCIR 601 specification but is not directly usable by other CCIR 601 standard equipment. Delay elements (not shown) will be required in the paths of the luminance signal Y and the key signal K, to compensate for delays in the other paths.

A problem with the practical realisation of the apparatus of FIG. 1 is in the frequency separation of each of the chrominance signals $C_B$ and $C_R$, due to the likelihood of simple band-splitting causing alias components in the region of 3.375 MHz due to the imperfect nature of practical separation filters. Ideal separation filters would require several hundred taps to achieve good performance and would create undesirable effects at the edges of the picture. This problem is overcome in the present embodiment by the form of the chrominance demultiplexers 4 and 5 which are basically identical, and one of which (the demultiplexer 4) will now he described with reference to FIG. 3.

The chrominance input signal $C_B$ is supplied by way of an input terminal 11 to a first low-pass filter 12 and to a third low-pass filter and delay element 13 which compensates for the delay in the first filter 12. The cut-off frequencies (−6 dB) of the first filter 12 and the third filter and delay 13 are equal to 7/16 and ⅞ Nyquist, respectively, that is 2.95 and 5.9 MHz, respectively. The outputs of the first filter 12 and of the third filter and delay 13 are supplied to a subtracter 14, the output of which is supplied to a demodulator 15 which also receives a modulation signal of ⅞ Nyquist frequency, by way of an input terminal 16. The modulated output signal is supplied by way of a second low-pass filter 17 to a 2:1 sub-sampler 18, together with the output signal from the first filter 12, which is passed by way of a delay element 19 which compensates for the delay in the elements 14, 15 and 17. The sub-sampler 18 supplies the respective chrominance output signals $C_{BL}$ and $C_{BH}$, both at 6.75 MS/s.

Figure 2:
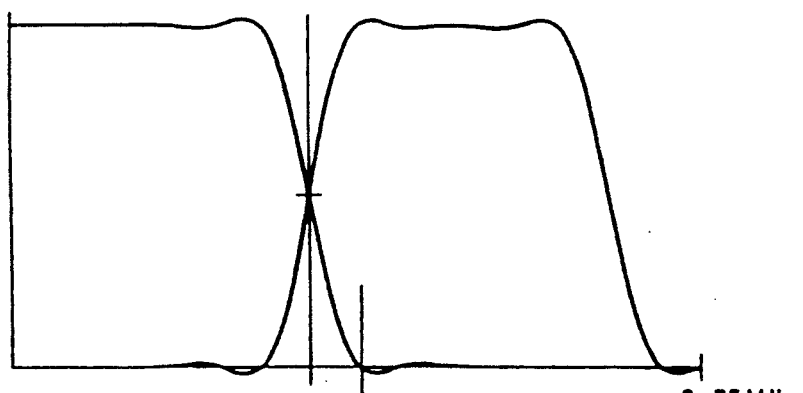
FIG. 2 shows the frequency responses of filters.

FIG. 2 shows typical frequency responses that can be achieved with available 31-tap finite impulse response filter chips. The left-band plot is for the low-pass filter 12 whose −6 dB point is at 7/16 Nyquist, that is 2.95 MHz, and the right-hand plot is for a high-pass version of the same filter hut with the addition of the low-pass filter and a delay 13 with a −6 dB point of ⅞ Nyquist, that is 5.9 MHz, which results in a band-pass filter. Such a low-pass filter 12 has a very low output at and above the half Nyquist frequency. The band-pass filter response, that is the effective response at the output of subtracter 14, maintains a bandwidth of less than half Nyquist frequency from ⅝ to ⅞ Nyquist frequency. The modulation frequency of ⅞ Nyquist frequency is then used in the demodulator 16 to bring this upper band to a lower band for sub-sampling.

Thus, returning to FIG. 3, the upper path effects the simple filtering and sub-sampling of the low frequency components of the chrominance input signal $C_B$, and the lower path effects the filtering and modulation of the high frequency components thereof.

Figure 3:
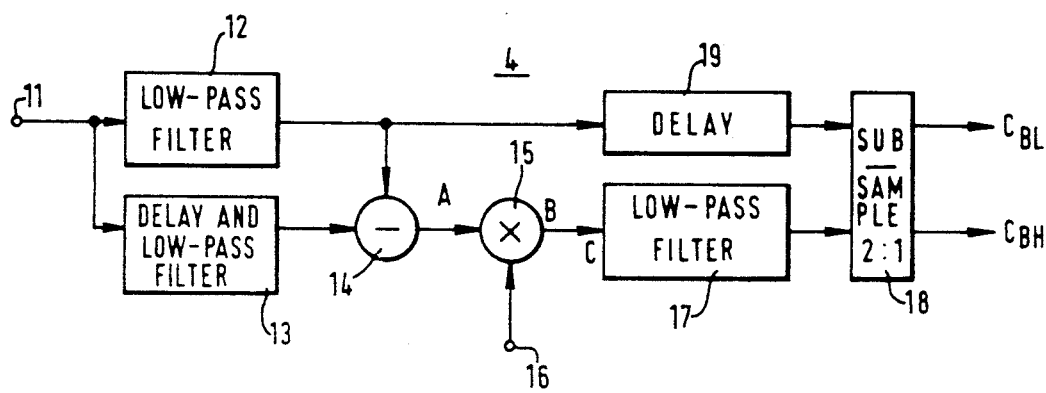
FIG. 3 is a block diagram of part of the apparatus of FIG. 1.
Figure 4:
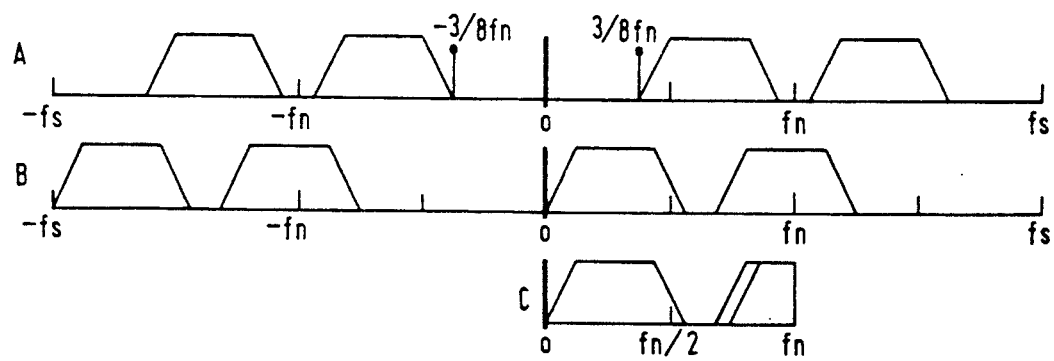
FIGS. 4A to 4C show frequency spectra for the apparatus of FIG. 3.

FIG. 4 shows frequency spectra for the points A, B and C of FIG. 3, where fs is the sampling frequency and fn is the Nyquist frequency. Plot A shows the frequency response after band-pass filtering. Both positive and negative frequencies are shown, as are frequencies above the Nyquist frequency, in order to confirm that they cannot 'beat' down into the sub-Nyquist band.

The modulation frequency of ⅞ Nyquist frequency is represented by a leftward shift of the frequency components. A rightward shift is also created, but ignored in this analysis simply because it produces symmetrical effects. The leftward shift of frequency components results in the frequency response of plot B. The frequency bands of plot B then fold into the bands illustrated in plot C. The upper band of plot C needs to be filtered out to remove potential alias frequencies prior to sub-sampling. This is done by the third low-pass filter 17. It should be noted that source frequencies above $\frac{7}{8}$ Nyquist frequency will produce alias components by this method. If the alias is significant (and it only occurs for source frequencies above 5.9 MHz) then the bandpass filter (12, 14) can be modified to have greater attenuation at 5.9 MHz and above.

Referring to FIG. 1, the demultiplexer 5 for the chrominance signal $C_R$ is basically identical to the demultiplexer 4 described, both in form and operation. Although in FIG. 1, the chrominance output signals $C_{BL}$ and $C_{RL}$, and $C_{BH}$ and $C_{RH}$ are multiplexed with the luminance signal Y and the key signal K, respectively, other pairs of these four chrominance output signals can alternatively be multiplexed with the luminance signal Y and the key signal K, respectively.

Multiplexing to reconstitute the input 4:4:4:4-standard digital video signal is in effect a mirror-image of demultiplexing. For each of the chrominance signals, the low frequency band signal $C_{BL}$ or $C_{RL}$ and the demodulated high frequency band signal $C_{BH}$ and $C_{RH}$ form inputs. A combiner is required to interpolate and remultiplex these two input pairs.

Figure 5:
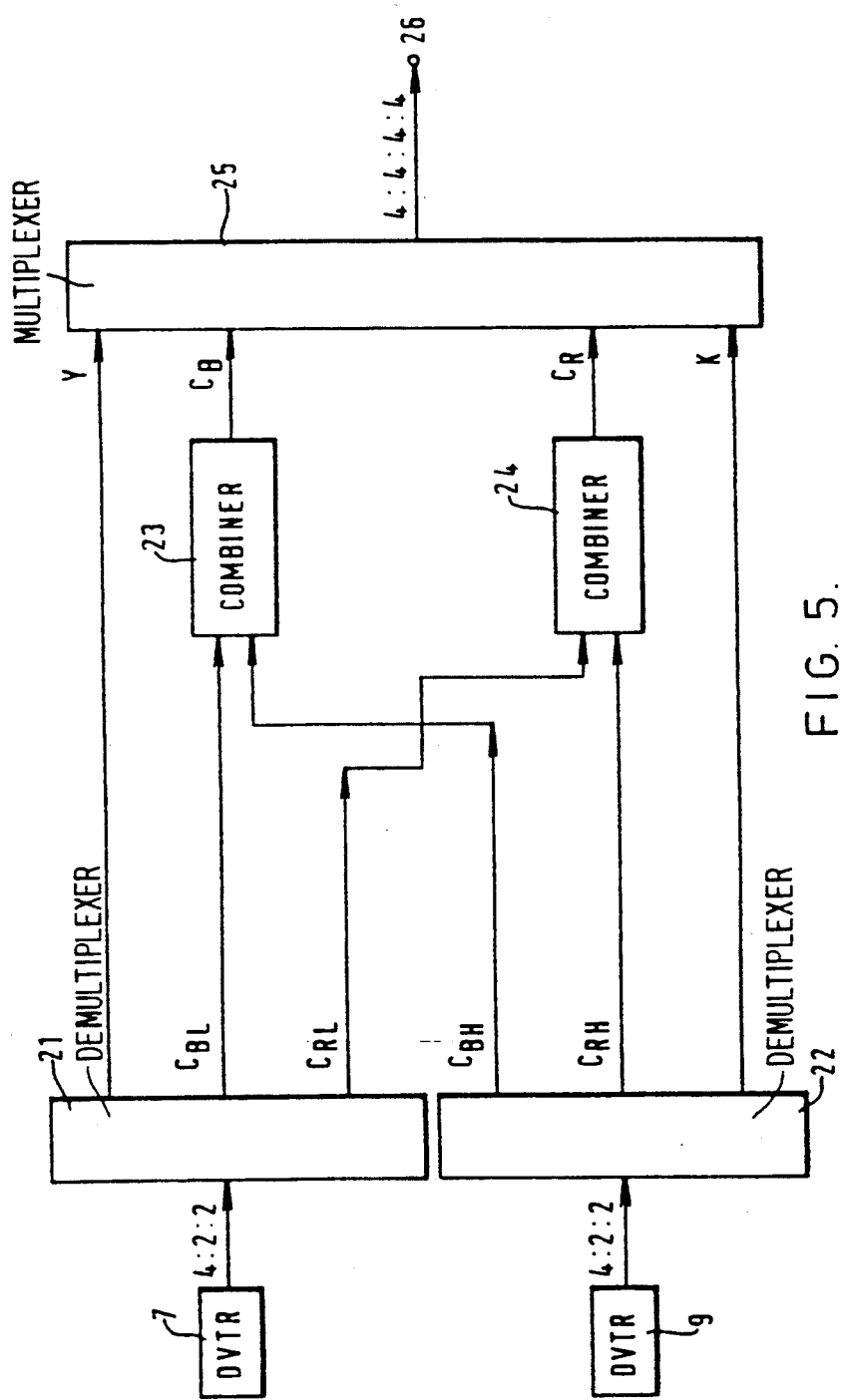
FIG. 5 is a block diagram of an embodiment of multiplexer apparatus for reconstituting an input signal supplied to the apparatus of FIG. 1.

Referring to FIG. 5, the DVTRs 7 and 9 supply respective reproduced 4:2:2 signals (comprising Y, $C_{BL}$, $C_{RL}$ and K, $C_{BH}$, $C_{RH}$, respectively) to demultiplexers 21 and 22 which separate the component signals. The chrominance signals $C_{BL}$ and $C_{BH}$, and $C_{RL}$ and $C_{RH}$ are supplied to combiners 23 and 24, respectively, which reconstitute the chrominance input signals $C_B$ and $C_R$ for supply to a multiplexer 25, together with the luminance input signal Y from the demultiplexer 21 and the key input signal K from the demultiplexer 22, to form the output 4:4:4:4 video signal for supply to an output terminal 26. Delay elements (not shown) will be required in the paths of the luminance signal Y and the key signal K to compensate for delays in the other paths.

Figure 6:
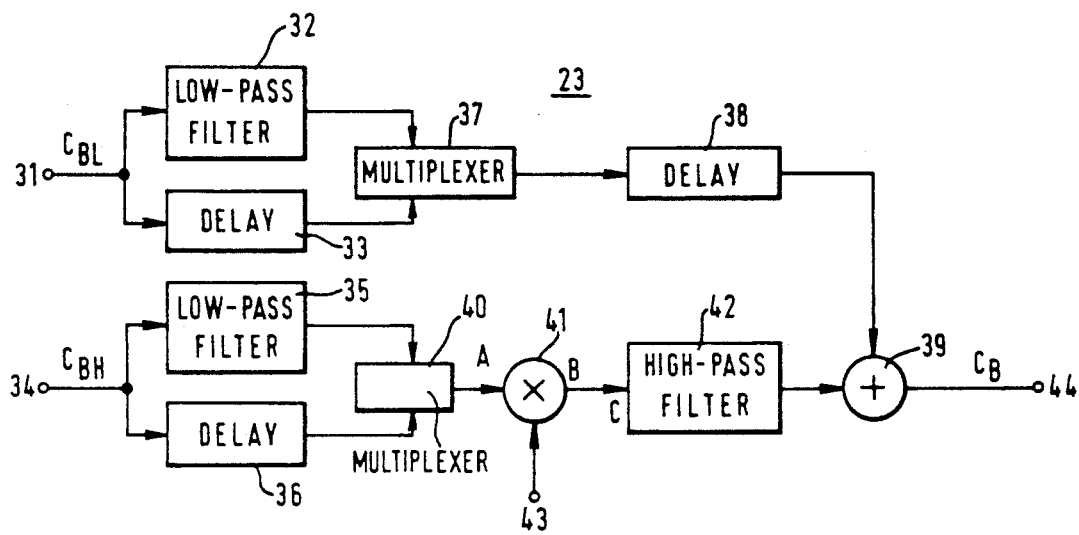
FIG. 6 is a block diagram of part of the apparatus of FIG. 5.

The combiners 23 and 24 are basically identical, and one of them (the combiner 23) will now be described with reference to FIG. 6. The chrominance signal $C_{BL}$ is supplied by way of an input terminal 31 to a fourth low-pass filter 32 with a cut-off frequency equal to half Nyquist frequency and to a delay element 33, while the chrominance signal $C_{BH}$ is supplied by way of an input terminal 34 to a fifth low-pass filter 35 with a cut-off frequency equal to half Nyquist frequency and to a delay element 36. The low-pass filters 32 and 35 provide linear interpolation of the input samples shifted by a half sample period. That is, a period equal to half the input 6.75 MHz period. The delay elements 33 and 36 compensate for the delays in the fourth and fifth low-pass filters 32 and 35. The outputs of the fourth low-pass filter 32 and of the delay element 33 are supplied to a multiplexer 37, the output of which passes by way of a delay element 38 to an adder 39. The outputs of the fifth low-pass filter 35 and of the delay element 36 are supplied to a mixer 40, the output of which is supplied by way of a demodulator 41 and a high-pass filter 42 with a cut-off frequency equal to $\frac{3}{8}$ Nyquist frequency to the adder 39. The demodulator 41 is supplied with a modulating signal of $\frac{3}{8}$ Nyquist frequency from an input terminal 43, and the high-pass filter 42 has a cut-off frequency equal to $\frac{3}{8}$ Nyquist frequency. The adder 39 supplies the reconstituted 13.5 MS/s chrominance signal $C_B$ to an output terminal 44, and thence to the multiplexer 25 (FIG. 5).

Figure 7:
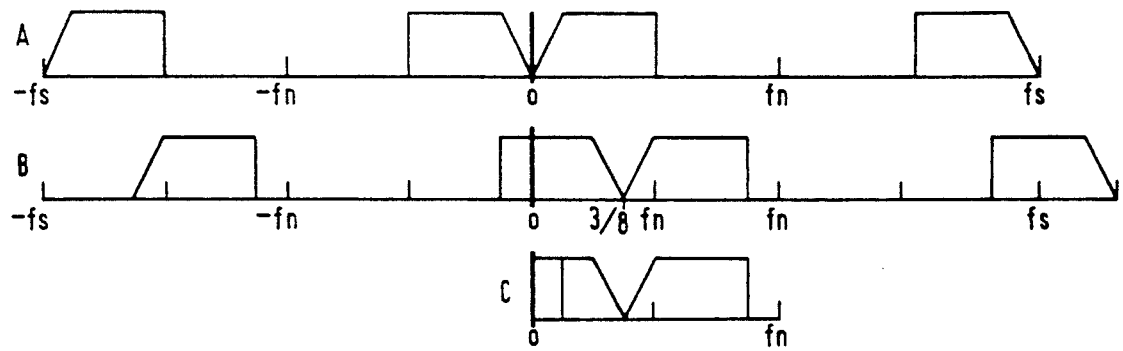
FIGS. 7A to 7C show frequency spectra for the apparatus of FIG. 6.

The purpose of the demodulator 41 is to move the frequencies of the upper band channel back to their original values. FIG. 7 shows frequency spectra for the points A, B and C in FIG. 6, and again fs is the sampling frequency and fn is the Nyquist frequency. Plot A shows the frequency response of the interpolated chrominance signal $C_{BH}$ supplied to the mixer 40, and plot B shows the frequency response after remodulation. As in the separation process described above, the demodulation ensures that the alias frequencies fold back correctly ensuring no deleterious effects. The frequency bands of plot C show the components of plot B folded within the Nyquist bandwidth. Thus, plot C shows the remodulated frequency response, which must be high-pass filtered to remove the unwanted low frequency components.

Referring to FIG. 5, the combiner 24 for the interpolated chrominance signals $C_{RL}$ and $C_{RH}$ is basically identical to the combiner 23 described, both in form and operation.

Various modifications can be made. For example, the filter cut-off frequencies of 7/16 Nyquist can be in the range x times Nyquist, where $0 < x \leq 0.5$, and the demodulation frequencies of $\frac{3}{8}$ Nyquist can be in the range y times Nyquist where $y < x$ and $0 < y \leq 0.5$.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of demultiplexing an input digital video signal conforming with a 4:4:4:4 standard into first and second output digital video signals each conforming with a 4:2:2 standard, the method comprising the steps of:

separating said input digital video signal into a luminance input signal, two chrominance input signals having a predetermined Nyquist frequency, and a fourth component input signal;

low-pass filtering each of the chrominance input signals with first low-pass filter means having a cut-off frequency equal to x times the predetermined Nyquist frequency of said input chrominance signals, where $0 < x \leq 0.5$, to produce respective first low-pass filtered chrominance signals;

sub-sampling the respective first low-pass filtered chrominance signals at a ratio of 2:1 to provide respective first and second chrominance output signals;

subtracting each of said respective first low-pass filtered chrominance signals from a corresponding one of said chrominance input signals to produce respective subtracted chrominance signals;

demodulating each of the respective subtracted chrominance signals with a signal having a frequency y times said predetermined Nyquist frequency, where $y < x$ and $0 < y \leq 0.5$, to produce respective demodulated signals;

low-pass filtering each of the respective demodulated signals with second low-pass filter means having a cut-off frequency equal to half of said predetermined Nyquist frequency, to produce respective second low-pass filtered chrominance signals; and sub-sampling each of the respective second low-pass filtered chrominance signals at a ratio of 2:1 to provide third and fourth chrominance output signals; and supplying said luminance input signal and a first pair of chrominance output signals selected from the first through fourth chrominance output signals as said first output digital video signal, and said fourth component input signal and a second pair of chrominance output signals selected from said first through fourth chrominance output signals as said second output digital video signal.

2. A method according to claim 1 wherein x is substantially equal to 7/16 and y is substantially equal to ⅜.

3. A method according to claim 2 further comprising attenuating frequency components above 5.9 MHz in said respective subtracted chrominance signals.

4. A method of multiplexing said first and second output digital video signals derived by a method according to claim 1, claim 2 or claim 3 into a reconstituted digital video signal conforming with a 4:4:4:4-standard, the method comprising the steps of:

for each of respective pairs of said first through fourth chrominance output signals derived from a corresponding one of said chrominance input signals;

interpolating each of the chrominance output signals in the respective pairs of signals at a ratio of 1:2 to produce corresponding pairs of first and second interpolated signals;

low-pass filtering said first and second interpolated signals of each pair with corresponding third and fourth low-pass filter means each having a cut-off frequency equal to half of said predetermined Nyquist frequency to produce corresponding pairs of first and second low-pass filtered signals;

demodulating one of the first and second low-pass filtered signals from each corresponding pair thereof with a signal having a frequency y times said predetermined Nyquist frequency to produce corresponding demodulated signals;

high-pass filtering the demodulated signals with respective high-pass filter means each having a cut-off frequency substantially equal to y times said predetermined Nyquist frequency to produce high-pass filtered signals; and combining each of the high-pass filtered signals with the other one of said first and second low-pass filtered signals of the corresponding pair thereof to reconstitute said chrominance input signals; and combining both the reconstituted chrominance input signals, said luminance input signal and said fourth component input signal to produce said reconstituted digital video signal.

5. Apparatus for demultiplexing an input digital video signal conforming with a 4:4:4:4 standard into first and second output digital video signals each conforming with a 4:2:2 standard, the apparatus comprising:

signal separation means for separating said input digital video signal into a luminance input signal, two chrominance input signals having a predetermined Nyquist frequency, and a fourth component input signal; said signal separation means including:

first low-pass filter means for low-pass filtering each of chrominance input signals, said first low-pass filter means having a cut-off frequency equal to x times said predetermined Nyquist frequency of said input chrominance signals, where $0 < x \leq 0.5$, to produce respective low-pass filtered chrominance signals;

sub-sampling means for sub-sampling each of the first low-pass filtered chrominance signals at a ratio of 2:1 to provide respective first and second chrominance output signals;

subtraction means for subtracting each of said respective first low-pass filtered chrominance signals from a corresponding one of said chrominance input signals to produce respective subtracted chrominance signals;

demodulator means for demodulating the respective subtracted chrominance signals with a signal having a frequency y times said predetermined Nyquist frequency, where $y < x$ and $0 < y \leq 0.5$, to produce respective demodulated signals;

second low-pass filter means for low-pass filtering each of the demodulated signals to produce respective second low-pass filtered chrominance signals, said second low-pass filter means having a cut-off frequency substantially equal to half said predetermined Nyquist frequency; and means for sub-sampling each of the respective second low-pass filtered chrominance signals at a ratio of 2:1 to provide respective third and fourth chrominance output signals; and means for supplying said luminance input signal and a first pair of chrominance output signals selected from the first through fourth chrominance output signals as said first output digital video signal, and said fourth component input signal and a second pair of chrominance output signals selected from the first through fourth chrominance output signals as said second output digital video signal.

6. Apparatus according to claim 5 wherein x is substantially equal to 7/16 and y is substantially equal to ⅜.

7. Apparatus according to claim 6 further comprising means for attenuating frequency components above 5.9 MHz in said respective subtracted chrominance signals.

8. Apparatus for multiplexing said first and second output digital video signals derived by an apparatus according to claim 5, claim 6 or claim 7 into a reconstituted digital video signal conforming with a 4:4:4:4-standard, the apparatus comprising:

respective interpolator means for interpolating corresponding pairs of chrominance output signals selected from said first through fourth chrominance output signals, each corresponding pair of chrominance output signals being derived from a corresponding one of said chrominance input signals, said interpolar means being operative to interpolate said corresponding pairs of chrominance output signals at a ratio of 1:2 to produce corresponding pairs of first and second interpolated signals;

low-pass filter means for low-pass filtering said first and second interpolated signals of each corresponding pair thereof to produce corresponding pairs of first and second low-pass filtered signals, said low-pass filter means having a cut-off frequency equal to half said predetermined Nyquist frequency;

demodulator means for demodulating one of the first and second low-pass filtered signals from each corresponding pair thereof with a signal having a frequency y times said predetermined Nyquist frequency to produce corresponding demodulated signals;

high-pass filter means for high-pass filtering the demodulated signals to produce high-pass filtered signals, said high-pass filter means having a cut-off frequency equal to y times said predetermined Nyquist frequency; and means for combining each of the high-pass filtered signals with the other one of said first and second low-pass filtered signals of said corresponding pair to reconstitute said chrominance input signals; and means for combining both the reconstituted chrominance input signals, said luminance input signal and said fourth component input signal to produce said reconstituted digital video signal.

9. A method of reconstituting a first digital video signal in a 4:4:4:4 standard format including a luminance signal, a pair of chrominance signals having a predetermined Nyquist frequency, and a fourth component signal, by multiplexing second and third digital video signals derived therefrom and provided in a 4:2:2 standard format, said second digital video signal including said luminance signal and a first pair of first and second chrominance signals derived from at least one of said pair of chrominance signals included in said first digital video signal, said third digital video signal including said fourth component and a second pair of third and fourth chrominance signals derived from at least one of said pair of chrominance signals included in said first digital signal, said method comprising the steps of:

interpolating each of the first through fourth chrominance signals in the first and second pairs thereof at a ratio of 1:2 to produce corresponding pairs of first and second interpolated signals, each of said corresponding pairs of first and second interpolated signals being derived from a corresponding one of the pair of chrominance signals included in said first digital video signal;

low-pass filtering said first and second interpolated signals of each pair thereof to produce corresponding pairs of first and second low-pass filtered signals with the use of low-pass filter means having a cut-off frequency substantially equal to half of said predetermined Nyquist frequency:

demodulating one of the first and second low-pass filtered signals from each corresponding pair thereof with a signal having a frequency y times said predetermined Nyquist frequency, where $0 < y \leq 0.5$, to produce corresponding demodulated signals;

high-pass filtering the demodulated signals to produce corresponding high-pass filtered signals with the use of high-pass filter means having a cut-off frequency equal to y times said predetermined Nyquist frequency;

combining each of the high-pass filtered signals with the corresponding other one of said first and second low-pass filtered signals to reconstitute the pair of chrominance signals included in said first digital video signal; and combining both the reconstituted pair of chrominance signals, said luminance signal and said fourth component signal to reconstitute said first digital video signal.

10. An apparatus for reconstituting a first digital video signal in a 4:4:4:4 standard format including a luminance signal, a pair of chrominance signals having a predetermined Nyquist frequency, and a fourth component signal, by multiplexing second and third digital video signals derived therefrom and provided in a 4:2:2 standard format, said second digital video signal including said luminance signal and a first pair of first and second chrominance signals derived from at least one of said pair of chrominance signals included in said first digital video signal, said third digital video signal including said fourth component and a second pair of third and fourth chrominance signals derived from at least one of said pair of chrominance signals included in said first digital signal, comprising:

means for interpolating each of the first through fourth chrominance signals in the first and second pairs thereof at a ratio of 1:2 to produce corresponding pairs of first and second interpolated signals, each of said corresponding pairs of first and second interpolated signals being derived from a corresponding one of the pair of chrominance signals included in said first digital video signal;

low-pass filter means for low-pass filtering said first and second interpolated signals of each pair thereof to produce corresponding pairs of first and second low-pass filtered signals, said low-pass filter means having a cut-off frequency substantially equal to half of said predetermined Nyquist frequency;

demodulating means for demodulating one of the first and second low-pass filtered signals from each corresponding pair thereof with a signal having a frequency y times said Nyquist frequency to produce corresponding demodulated signals;

high-pass filter means for high-pass filtering the demodulated signals to produce corresponding high-pass filtered signals, said high-pass filter means having a cut-off frequency equal to y times said predetermined Nyquist frequency, where $0 < y \leq 0.5$;

means for combining each of the high-pass filtered signals with the corresponding other one of said first and second low-pass filtered signals to reconstitute the pair of chrominance signals included in said first digital video signal; and means for combining both the reconstituted pair of chrominance signals, said luminance signal and said fourth component signal to reconstitute said first digital video signal.

* * * * *